(12) United States Patent
Brady et al.

(10) Patent No.: US 7,385,942 B2
(45) Date of Patent: Jun. 10, 2008

(54) SYSTEM FOR MAINTAINING THE INTEGRITY OF REMOTE DATA BY MAKING IT DISPOSABLE

(75) Inventors: Stephen Brady, White Plains, NY (US); Shu-Ping Chang, Shrub Oak, NY (US); James S. Lipscomb, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 760 days.

(21) Appl. No.: 10/792,329

(22) Filed: Mar. 3, 2004

(65) Prior Publication Data

US 2005/0195735 A1    Sep. 8, 2005

(51) Int. Cl.
  *G01R 31/08*  (2006.01)
  *H04B 7/185*  (2006.01)
(52) U.S. Cl. .................. 370/316; 370/246; 370/216; 709/227; 709/224
(58) Field of Classification Search ................ 370/241, 370/413, 246, 216, 219, 220, 243, 242, 315, 370/316, 245, 310, 312; 709/203, 208, 211, 709/212, 209, 224, 227
See application file for complete search history.

(56) References Cited

U.S. PATENT DOCUMENTS

| | | | |
|---|---|---|---|
| 5,263,165 A | 11/1993 | Janis | |
| 6,272,631 B1 | 8/2001 | Thomlinson et al. | |
| 6,931,552 B2 * | 8/2005 | Pritchard et al. | 726/34 |
| 7,058,978 B2 * | 6/2006 | Feuerstein et al. | 726/26 |

* cited by examiner

*Primary Examiner*—Hanh Nguyen
(74) *Attorney, Agent, or Firm*—Sawyer Law Group LLP

(57) ABSTRACT

In a networked system having a protected central server network connected to one or more satellite servers, the central server includes master data, and each satellite system includes replicated data derived from the master data. A corruption of at least a portion of the replicated data in one of the satellite servers is determined. Responsive to determining the corruption, at least the corrupted portion of the replicated data is replaced in the satellite server with data derived from the master data of the central server.

11 Claims, 2 Drawing Sheets

SYSTEM FOR MAINTAINING THE INTEGRITY OF REMOTE DATA BY MAKING IT DISPOSABLE

BACKGROUND OF THE INVENTION

1. Field of the Invention

The present invention is directed to a method and system for protecting data from being lost or damaged, accidentally or by sabotage.

2. Description of the Prior Art

It is difficult to protect network-accessible data from being lost or damaged, accidentally or by sabotage. It is particularly difficult to protect data that is replicated over multiple network-accessible locations. A failure of the system to protect the data at any one or more of the locations needs to be rapidly known, and corrective measures need to be taken promptly.

This situation is becoming more difficult to deal with because data is more widely disseminated among more computers, each of which is potentially vulnerable. Accidents are more likely to happen with this increased degree of complexity. Skilled crackers (malevolent hackers), viruses (programs that "infect" other programs by embedding into them), worms (programs that self-reproduce and propagate over a network) and Trojan horses (security-breaking programs disguised as something benign) are becoming more capable and numerous. Defending every computer from every type of accident and attack has had limited success. In theory each computer can be maintained with the latest security patches and with adequate staff on hand to defend against attacks, however, this rarely happens because it is prohibitively expensive.

It is therefore desirable to provide an improved method, system and article of manufacture for maintaining the integrity of network-accessible data.

BRIEF SUMMARY

In accordance with one aspect, a method is provided of maintaining integrity of data in a networked system having a central server system which is network connected to a satellite server system. The central server system is more strongly protected than the satellite server system. The central server system includes master data. The satellite server system includes replicated data derived from said master data. A corruption is determined of at least a portion of said replicated data in said satellite server system. Responsive to said determining of corruption, at least said portion of said replicated data in said satellite server system is replaced with replacement replicated data derived from said master data.

In accordance with another aspect, a system is disclosed, including a user accessible data storage, a substantially user inaccessible data storage storing master data, and one or more servers. The one or more servers perform a method including: deriving replicated data from the master data; computing a verification record indicative of the replicated data using a selected checking algorithm; storing the replicated data on the user accessible data storage as replicated data stored on the user accessible data storage; detecting corruption of said replicated data stored on the user accessible data storage based on the verification record; and repeating the storing responsive to said detecting of corruption.

In accordance with yet another aspect, a computer program product is disclosed comprising a computer usable medium having computer readable program code embodied in said medium for use in maintaining integrity of data of a user accessible satellite server. The computer readable program code comprises: program code for deriving replicated data from a master database; program code for applying a checking algorithm to the replicated data to produce a verification record; program code for storing the replicated data on the user accessible satellite server as satellite server stored replicated data; program code for applying the checking algorithm to said satellite server stored replicated data to produce a status record; and program code for producing a corrective action responsive to comparison of the status record and the verification record indicating a corruption of said satellite server stored replicated data.

BRIEF DESCRIPTION OF THE DRAWINGS

The invention may take physical form in certain parts and processes and arrangements of parts and processes, the preferred embodiments of which will be described in detail in this specification and illustrated in the accompanying drawings hereof. It is to be understood that both the foregoing general description and the following detailed description are examples and explanatory only, and are not to be construed as restricting the invention as claimed.

DETAILED DESCRIPTION OF THE INVENTION

Figure 1:
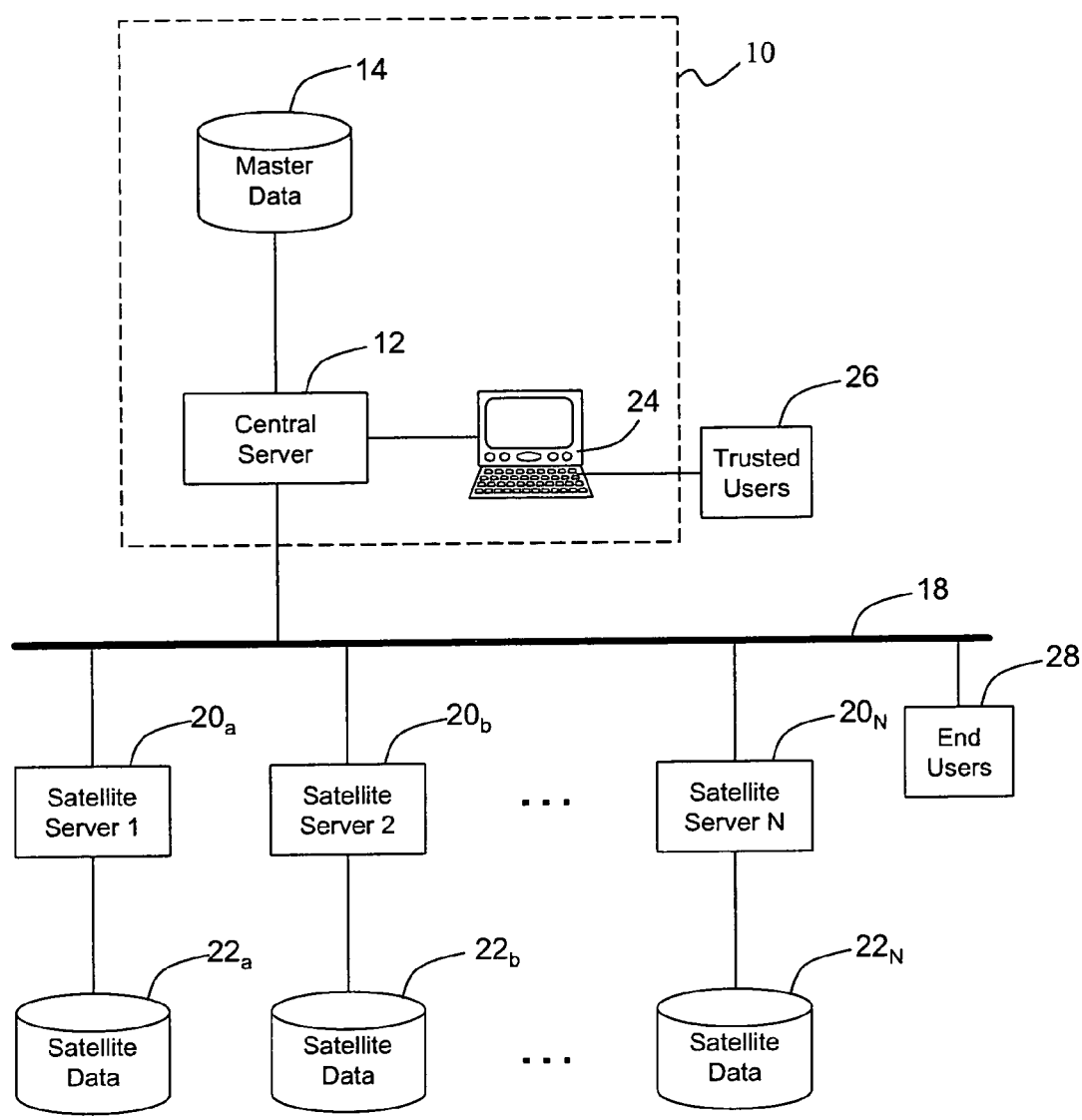
FIG. 1 is a block diagram of an exemplary system for providing network accessible data.

With reference to FIG. 1, a central system including a master copy of data, referred to hereinafter as master data, is protected via strong defense methods known in the art. These strong defenses are diagrammatically represented by a firewall 10. The central system protected by the firewall 10 includes a central server 12 and a master data storage 14 storing data assets that make up the master data. The master data, or selected portions thereof, are provided to one or more satellite systems. Specifically, the central server 12 sends copies of the master data, or portions thereof, to the satellite systems via a network 18. The network 18 may be the Internet, a local area network, a wireless network, or the like, or some combination thereof.

Each of the satellite systems includes a satellite server and a corresponding data storage for storing the copies or replications of the master data or selected portions thereof. The number of satellite systems is substantially arbitrary. In the example illustrated embodiment, there are N satellite servers $20_a$-$20_N$ and a corresponding N replicated data storages $22_a$-$22_N$ each of which stores replicated data derived from the master data and received from the central server 12. The satellite servers $20_a$-$20_N$ may be any computer or type of computer system, e.g., web servers. The data storages $22_a$-$22_N$ can be substantially any type of data storage medium, such as magnetic media, optical media, or the like. While each data storage $22_a$-$22_N$ is illustrated as a single unit, it will be appreciated that a data storages may be comprised of a plurality of storage units, such as a plurality of magnetic disks, a combination of magnetic disks and cache memory, or the like. Still further, the satellite systems can be different from one another. For example, the satellite servers $20_a$-$20_N$ can be different types of computers or can have different types of server hardware configurations, and the data storages $22_a$-$22_N$ can also be different from one another. The portion of the master data copied or replicated to each satellite system may also be different for the various satellite servers $20_a$-$20_N$.

Moreover, while the portion of the master data received by each satellite is referred to herein as a copy or a replication of that portion of the master data, it is to be appreciated that the copy or replication may be converted or otherwise modified compared with the master data stored in the master data storage 14. For example, table schema or other data organization structures may be altered, the internal storage format of the data may be converted (for example, from one image type to another image type, or from one numeric representation format to another numeric representation format), or so forth, in order for the copied or replicated data to comport with the configuration of the receiving satellite system.

The master data stored in the master data storage 14 is preferably generally inaccessible to ordinary users of the system. In the illustrated embodiment, the master data is entered, modified, or otherwise manipulated via a user interface 24 communicating with the central server 12 and providing an input/output interface for selected trusted users 26. In other embodiments, the trusted users may access the central server 12 through the network 18, using suitable passwords or other security measures incorporated into the firewall 10. The trusted users 26 may also include application programs, other servers, or the like which communicate with the server 12 by a secure connection or secure protocol.

The master data storage 14 and associated central server 12 are strongly protected by the firewall 10 or other security measures. On the other hand, the satellite systems are generally less well protected, as it is expensive and difficult to provide strong protection for what may be a substantial number of satellite systems, which satellite systems may be physically remote from one another, may be connected with different networks, or may present other peculiar maintenance or security problems. Additionally, the satellite systems are generally routinely accessed by end users 28, providing opportunities for security breaches caused by hackers, viruses, Trojan horse programs, or the like. As a result, a copy of the master data stored on one or more of the satellite data storages $22_a$-$22_N$ may become corrupted. In contrast, the master data storage 14 and associated central server 12 is substantially user inaccessible and is generally not accessed except by trusted users 26, and so the data in the master data storage 14 generally retains its integrity. The problem of the relatively less secure satellite systems is addressed as follows: If replicated data on one of the a satellite systems becomes corrupted, it is discarded and replaced by a new copy of the data derived from the master data storage 14 or from another secure data repository. Corrupted data is thus removed in order to defend the integrity of the system.

Toward this end, the satellite servers $20_a$-$20_N$ are periodically polled by the central server 12 for a data integrity status message. In another approach, each satellite server $20_a$-$20_N$ periodically sends a data integrity status message to the central server 12 without being polled. In either approach, the status messages provide indications of the integrity of the replicated data on each replicated data storage $22_a$-$22_N$. When the status message of one of the satellite systems is missing or indicates corruption of the data on the respective satellite data storage $22_a$-$22_N$, or portions thereof, the central server 12 generates an alarm and automatically resends a copy of all or part of the master data 14 to the affected satellite system to assure integrity of the replicated data storage of that satellite system.

Replicated data integrity is preferably indicated by an integrity indicator, status record, or the like, contained in a replication status message from each of the satellite servers $20_a$-$20_N$ and indicating the current state of the replicated data in the corresponding replicated data storage $22_a$-$22_N$ in such a way that, if the data changes undesirably or unexpectedly, the integrity indicator changes accordingly. An example of an indicator in a status message that serves this purpose is a current checksum of the respective replicated data $22_a$-$22_N$. A changed integrity indicator, such as a changed checksum value, indicates unexpectedly changed, added or missing data, which is therefore corrupt. Error detection and recovery in response to a corruption can be prompt and automatic. For example, if there is a security lapse and an attack on the system that results in corrupted replicated data on one of the satellite systems, the corrupted data can be corrected automatically. Moreover, the changed integrity indicator can be used to provide notification of a possible security problem.

The central server 12 optionally sounds an alarm at a user interface 24 and refreshes the corrupted replicated data at the affected one of the satellite data storages $22_a$-$22_N$ from the master data stored in the master data storage 14. In the event of an ongoing external attack on the data, or another source of recurring data corruption, the replicated data can be recopied each time the status indicator indicates a recurrence of corruption of the data. Such recurring corrective action can be taken automatically, without human intervention. Moreover, the changed status indicator can be used to provide a problem notification to human personnel or an automatic virus checker who or which can determine the source of the recurring corruption and take more permanent corrective measures. The user interface 24 is preferably available only to trusted users 26, such as system administrators, authorized data entry operators, or the like, of the central server 12.

In one embodiment, the corrective recopying of data from the master data storage 14 is transparent to end users 28 of the affected satellite system. The end users 28 may be substantially unaffected by the security lapse or other cause of data corruption because of the promptness of the corrective action. In another embodiment, the changed status indicator is used to send a message to end users 28 indicating that data the end user received from that satellite system may be of questionable reliability and integrity. The affected satellite system is optionally also made unavailable for access by end users 28 during the time interval between the detection of corruption and completion of corrective recopying of data from the master data storage 14.

Figure 2:
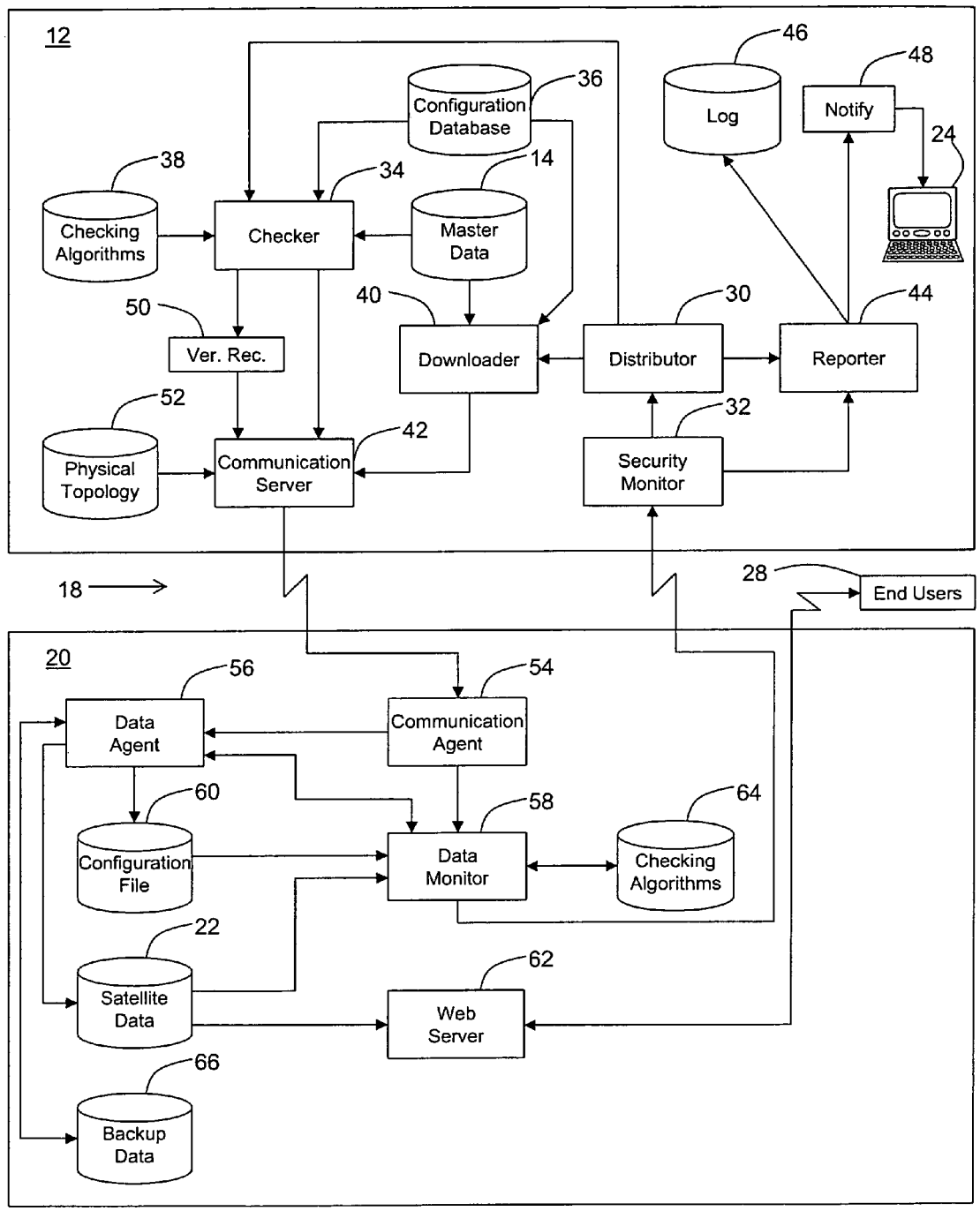
FIG. 2 is a more detailed diagram of the central server and one of the satellite systems of FIG. 1.

FIG. 2 shows the central server 12 connected via the network 18 to a satellite server 20, wherein satellite server 20 and associated replicated data storage 22 represent one of the satellite servers $20_a$-$20_N$ and respective replicated data storage $22_a$-$22_N$. Although the central server 12 is typically connected to a plurality of satellite servers $20_a$-$20_N$, only one satellite server 20 is shown for explanatory purposes. The other satellite servers operate in a similar fashion as the example satellite server 20 described.

In the central server 12, a distributor 30 functions as a supervisor and a controller. It controls sharing of all or selected portions of the master data stored in the master data storage 14 with the various satellite servers $20_a$-$20_N$ including the example satellite server 20. Although the master data base 14 is shown as a single database, it is to be understood that the master data base may include multiple physical storage systems or media, and may include a plurality of logical data storage entities, such as databases, folders or directories of images, text files, web archives, and so forth, which are not restricted to any particular format.

The distributor 30 performs a plurality of functions such as: scheduling when to poll the satellite server 20 for the data integrity status message (assuming that polling is performed; alternatively, the satellite server 20 may send the data integrity status message at selected time intervals or using another schedule); acting on replies from the satellite server 20 according to the received data integrity status indicator; deciding how to communicate with the satellite server 20; deciding which protocols and topology to use; and so forth. Some suitable communication protocols are HTTP and FTP, among others. Communication topologies include direct connection via phone lines or via dedicated lines, communication by Internet protocol (IP) over the Internet, and other suitable topologies.

The distributor 30 also decides when to recopy replicated data from the master data storage 14 to the satellite data storage 22, as well as which portion, if not all, of the data in the master data to send to the affected satellite server 20 for refreshing the replicated data storage 22. Such recopying of the replicated data can be performed for a number of reasons. For example, the recopying may occur responsive to new or updated data becoming available at the central server 12, old data is to be deleted at the satellite server 20. The recopying may also occur because the integrity indicator in the replication status message from the satellite 20 does not pass an inspection by a security monitor 32 on the central server 12, or a replication status message has not been received at the central server 12 from the satellite server 20. When replicated data on the satellite server 20 is to be refreshed, a checker 34 running on the central server 12 is informed. The checker 34 makes an up-to-date verification record 50, for example a checksum, corresponding to the new copy of data which is to be sent to the satellite server 20. The data security monitor 32 periodically compares this transmitted verification record to a corresponding status record that is determined by the satellite server 20 for the replicated data stored on the satellite data storage 22.

The distributor 30 distributes data from the master data storage 14 to the satellite server 20 through a downloader 40 which accesses the network 18 via a communications server 42. Data is preferably only "pushed" to the satellite server 20 because replicated data stored in the satellite data storage 22 is not trusted. Optionally, the distributor 30 also reports its actions to a reporter process 44 which logs the reported actions to a log file 46. The reporter process 44 also optionally notifies a system operator or administrator via a notify process 48 of any indication of corrupted data provided by a changed data integrity status indicator.

The data on the master data storage 14 is strongly safeguarded at the central server 12 for distribution to the satellite server 20. Data is created, stored, edited, and managed on the central server 12 by trusted users 26. Data is not created or managed on the satellite server 20. For media data, this type of server is known as a Media Asset Manager (MAM) server. The central server 12 pushes data to the satellite server 20, which itself may be a web server for example. The trusted users 26 include trusted agents who are allowed to change the master data 14. This can include designated employees or designated application programs that are deemed trustworthy by the administrators of the central server 12.

The configuration database 36 maps where the replicated data is to be stored in the satellite server 20. The configuration database 36 may also provide data format conversion mapping, image format conversion, table schema reconfiguration, or other data or organizational changes for adapting the replicated data to the satellite server 20. In cases where such data or organizational changes are performed, it will be appreciated that the copied or replicated data is derived from the master data but may not be an exact bit-for-bit duplicate of that master data. The downloader 40 provides the data and information on its configuration to the communication server 42 for delivery to the satellite server 20 when directed by the distributor 30. Checking algorithms 38 are used by the checker 34 to make the verification record 50 that has a value unique, or almost unique, for this set of data and its configuration. The checker 34 reads the data and its configuration and, using a checking algorithm, makes up the verification record 50. It makes this record, as well as the checking algorithm used to make it, available for transmission to the satellite server 20. The satellite server 20 uses the received checking algorithm to periodically recheck the replicated data 22 and its configuration, expecting the same answer as provided in the verification record 50.

Physical topology information 52 is used by the communication server 42 to determine what path and means are to be used to send data to and receive data from the satellite server 20. The communication server 42 sends to the satellite server 20 the data to be stored on it, the data's configuration (where it is to be stored), checking algorithms and checking results to expect for the satellite server 20 to utilize to verify the integrity of the data, and the topology for replies to the central server 12.

The security monitor 32 receives replication status messages, each including an integrity status indicator, from the satellite server 20. The satellite server 20 reports either a good replicated data integrity status or a corruption of the replicated data, and the security monitor passes this reported information to the distributor 30 for action. The received integrity indicator status information is also transmitted to the reporter 44 for logging to the log 46 and for notification of authorized users, including administrators, via the notify process 48. The reporter 44 receives the status of satellite server 20 data integrity from the security monitor 32 and actions based on that status from the distributor 30. The reporter 44 logs this information and alerts administrators as necessary. The log file 46 is used to make a permanent record of satellite server 20 data integrity status, and distributor 30 actions, based on the received integrity status. The notify process 48 receives the integrity status information requiring action or attention by an administrator from the reporter 44 and alerts administrators 26 by means of the interface device 24 such as, e.g., a computer monitor or beeper.

On the satellite server 20, a communication agent 54 receives data from the communication server 42 on central server 12. The received data and the data's configuration (where it is to be stored) are forwarded to a data agent 56 to be stored. A data monitor 58 also receives respective checking algorithms from the central server-side checking algorithms database 38 and the verification record 50 containing data checking results for the satellite 20 to use for verifying the integrity of the received data, and the topology to use for replies to the central server 12.

The data agent 56 stores the data received from the communication agent 54 in the satellite replicated data storage 22 based on the received data configuration. The received data configuration is stored in a satellite configuration file 60. The received checking algorithms are stored on a satellite checking algorithm database 64. The replicated data stored in the satellite replicated data 22 is then available to users of the satellite server 20, for example by means of a data server 62, which in one embodiment is a web server serving Internet users 53 via network 18. The data server 62 is just one example of an application using the replicated data, serving it to clients.

Checking algorithms 64 received from the central server 12 provide the data monitor 58 with information on how to check the integrity of the received replicated data 22 and, preferably, the configuration file 60. Expected results of the checking, as provided in the verification record 50, are also stored in the checking algorithm database 64. The data monitor 58 checks the replicated data by applying the checking algorithms to the replicated data on the satellite replicated data storage 22 to produce a status record corresponding to the verification record 50, and produces an integrity status signal, value, report or the like based on a comparison of the results of checking the data to the expected results stored in the configuration file 60. For example, the expected results could be a check-sum in some embodiments.

The checking process may be performed periodically with the most recent results always available for transmission to the central server 12, or the checking process may be run on demand by the communication agent 54, for example when a request or poll for an integrity evaluation comes from the central server 12. Specifically, the data monitor 58 receives checking algorithms 38 with expected results in the verification record 50 from the central server 12 by way of the communication agent 54. The data monitor 58 also receives and stores the frequency with which these checks must be made and the physical topology information on how to respond, which it also stores in, e.g., the satellite configuration database 60.

Periodically, the data monitor 58 reads the configuration file 60, checks it according to the stored verification record 50, and uses information therein to locate the replicated data 22, which it also checks according to the stored verification record 50, using the stored checking algorithms 64 for performing the checking operations. The data monitor 58 may also check the frequency information of the verification record 50 and the checking algorithms 64 themselves to ensure that they are not corrupted. It compares status record resulting from the checking to the expected verification record 50 stored with the checking algorithms 64 and reports back by way of the specified topology to the central server 12 the integrity status of the replicated data storage 22. The replication status message, including the integrity status indicator, may be an overall report indicating if all the data is accurate or not, or it could be a report that just parts of the data are corrupted, in which case the central server 12 may, if so configured, send back partial data to overwrite just the portions identified as corrupted.

In another embodiment, the verification record 50 is not transmitted to the satellite server 20, but rather is retained at the central server 12. The satellite server 20 computes a corresponding status record from the data in the satellite data storage 22 using a checking algorithm stored in the database 64 which corresponds to the checking algorithm 38 stored at the central server 12. The status record computed at the satellite server 20 is sent back to the central server 12, and the security monitor 32 of the central server 12 compares the received status record with the verification record 50 stored at the central server 12 to determine whether the data in the satellite data storage 22 has been corrupted.

The data agent 56 may optionally make a backup copy of the replicated data 22 from the central server 12, storing it in a backup database 66 that no other components of the satellite server 20, except the data agent 56 itself, may access. The backup database 66 is shown in the illustrated embodiment as being part of the satellite server 20; however, the backup database 66 may, optionally, be at another location, possibly on another computer connected to the satellite server 20 by a communication line.

When the data monitor 58 detects a problem with the replicated data 22, or portions thereof, it may optionally instruct the data agent 56 directly to refresh the replicated data and configuration file 60 from the backup copy 66 rather than, or in addition to, refreshing from the central server 12. Before instructing the data agent 56 to perform this service, the data monitor 58 may optionally request the backup data from the data agent 56 and evaluate it for integrity. The above-described backup procedure forms a hierarchy of data protection. The most protected master data 14 resides on the central server 12, medium-protected backup data 66 is stored in a restricted access location, accessible by the satellite server 20, and disposable replicated data 22 is available to the data server 62 on the satellite server 20. While one additional backup level has been described in this embodiment, the intermediate backup stage of medium-protected data in this hierarchy is not limited to one level.

In one alternative embodiment, the central server 12 does not poll the satellite server 20 for a replication status message, but instead expects to receive replication status messages periodically on the initiative of the satellite server 20. When the central server 12 receives a faulty replication status message (one including an integrity status indicating a corruption of the replicated data), or fails to receive a replication status message, the central server 12 assumes a corruption and sends replacement data to the satellite server 20 to replace some or all of the data in the replicated data storage 22 on the satellite server 20.

In some embodiments, the central server 12 does not remain connected with the network 18 constantly. Rather, in these embodiments the central server 12 is ordinarily disconnected from the network 18, and connects with the network 18 for relatively brief time intervals during which time intervals the central server 12 polls the satellite servers 20 and performs refresh data copying to those satellite servers as needed. Similarly, in embodiments in which polling is not used, the central server 12 optionally connects with the network 18 for relatively brief time intervals during which time intervals the central server 12 receives the expected data integrity status signals from the satellite servers 20 and performs refresh data copying to those satellite servers as needed. In this approach, the data integrity status signals may be queued until the central server 12 connects with the network to receive the signals. By having the central server 12 disconnected from the network 18 most of the time, the likelihood of hacker activity, viruses, or other securities breaches accessing and damaging the central server 12 is substantially decreased.

The detailed description has been herein presented in terms of general procedures, processes, and symbolic representations of operations of data bits within a computer memory, associated computer processors, networks, and network devices. These procedure descriptions and representations are the means used by those skilled in the data processing art to convey the substance of their work to others skilled in the art. A procedure is here, and generally, conceived to be a self-consistent sequence of operations or actions leading to a desired result. Thus, the term "procedure" is generally used to refer to a series of operations performed by a processor, be it a central processing unit of a computer, or a processing unit of a network device, and as such, encompasses such terms of art as "objects," "functions," "subroutines," and "programs."

The procedures presented herein are not inherently related to any particular computer or other apparatus. In particular, various general-purpose machines may be used with programs in accordance with the teachings herein, or it may prove more convenient to construct more specialized apparatus to perform the required methods.

However, one of ordinary skill in the art will recognize that a variety of platforms and languages exist for creating software for performing the procedures outlined herein. One of ordinary skill in the art also recognizes that the choice of the exact platform and language is often dictated by the specifics of the actual system constructed, such that what may work for one type of general purpose computer may not be efficient on another type of general purpose computer.

One of ordinary skill in the art to which this invention belongs will have a reasonable understanding of data systems having replicated data. It being recognized that such practitioners do not require specific details of the software, but rather find data structure descriptions and process descriptions more desirable (due to the variety of suitable hardware and software platforms), such specifics are not discussed herein.

The invention has been described with reference to the preferred embodiments. Modifications and alterations will occur to others upon a reading and understanding of the specification. It is our intention to include all such modifications and alterations insofar as they come within the scope of the appended claims, or the equivalents thereof.

We now claim:

1. A system comprising:
a network;
a satellite server connected to the network; and
a central server communicating with the satellite server via the network, the central server including
a master data storage storing master data,
a checker using a checking algorithm to generate a verification record for satellite data to be distributed to the satellite server, the satellite data being derived from the master data,
a distributor distributing the satellite data and the checking algorithm used to generate the verification record for the satellite data to the satellite server, and
a security monitor
monitoring for status messages from the satellite server,
responsive to receiving a status message from the satellite server during a scheduled time interval or in response to a status request sent to the satellite server, determining whether the satellite data at the satellite server is corrupted based on the received status message, and
responsive to not receiving a status message from the satellite server during a scheduled time interval or in response to a status request sent to the satellite server, determining that the satellite data at the satellite server is corrupted, responsive to the security monitor determining that the satellite data at the satellite server is corrupted, the distributor re-distributing the satellite data to the satellite server.

2. The system of claim 1, wherein the central server is disconnected from the network when the central server is not communicating with the satellite server.

3. The system of claim 1, wherein the security monitor determines whether the satellite data at the satellite server is corrupted by comparing the verification record to a status record in the received status message, the status record having been generated by the satellite server using the checking algorithm distributed by the distributor.

4. The system of claim 1, wherein the distributor further distributes the verification record for the satellite data to the satellite server along with the satellite data and the checking algorithm used to generate the verification record.

5. The system of claim 4, wherein the security monitor determines whether the satellite data at the satellite server is corrupted by examining an integrity indicator in the received status message, the integrity indicator having been created by the satellite server based on a comparison of the verification record distributed by the distributor and a status record generated by the satellite server using the checking algorithm distributed by the distributor.

6. The system of claim 1, wherein the satellite data is a replicate of all or part of the master data.

7. The system of claim 1, wherein the central server further includes
a reporter, responsive to the security monitor determining that the satellite data at the satellite server is corrupted, the reporter notifying a system operator of the satellite data corruption.

8. The system of claim 1, wherein the satellite server includes
a communication agent receiving the satellite data and the checking algorithm used to generate the verification record for the satellite data distributed by the distributor,
a satellite data storage storing the received satellite data,
a database storing the received checking algorithm, and
a data monitor
creating status messages relating to integrity of the satellite data stored in the satellite data storage at scheduled time intervals or in response to status requests from the central server, and
transmitting the status messages to the security monitor of the central server.

9. The system of claim 8, wherein creation of status messages by the data monitor includes generation of status records by applying the received checking algorithm stored in the database to the received satellite data stored in the satellite data storage.

10. The system of claim 8, wherein
the communication agent further receives the verification record for the satellite data along with the satellite data and the checking algorithm used to generate the verification record, and
the database further stores the received verification record.

11. The system of claim 10, wherein creation of status messages by the data monitor includes
generation of status records by applying the received checking algorithm stored in the database to the received satellite data stored in the satellite data storage, and
creation of integrity indicators based on comparisons of the received verification record stored in the database and the generated status records.

* * * * *